US006638490B2

(12) United States Patent
Jamriska, Sr. et al.

(10) Patent No.: US 6,638,490 B2
(45) Date of Patent: Oct. 28, 2003

(54) PRODUCTION OF HIGH SPECIFIC ACTIVITY COPPER-$^{67}$

(75) Inventors: David J. Jamriska, Sr., Los Alamos, NM (US); Wayne A. Taylor, Los Alamos, NM (US); Martin A. Ott, Los Alamos, NM (US); Malcolm Fowler, Los Alamos, NM (US); Richard C. Heaton, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 10/246,960

(22) Filed: Sep. 18, 2002

(65) Prior Publication Data

US 2003/0016775 A1 Jan. 23, 2003

Related U.S. Application Data

(62) Division of application No. 08/226,526, filed on Apr. 12, 1994, now Pat. No. 6,490,330.

(51) Int. Cl.[7] .............................................. C01G 57/00
(52) U.S. Cl. ....................................... 423/249; 376/190
(58) Field of Search ................................ 376/194, 195, 376/190; 423/249

(56) References Cited

U.S. PATENT DOCUMENTS 4,487,738 A * 12/1984 O'Brien et al. ............. 376/194
4,622,201 A * 11/1986 Robertson ................... 376/195
5,162,231 A * 11/1992 Cole et al. .................. 376/195
5,425,063 A * 6/1995 Ferrieri et al. .............. 376/195

OTHER PUBLICATIONS

Appl. Radiet. Isot., vol. 37, No. 1, pp 29–36, Mirzadeh et al, 1986.*

Physical Review C, vol. 18, No. 1 pp 148–157, Lux et al, Jul. 1978.*

Nuclear Physics, vol. A 249, No. 1, pp 166–172, Reiter et al, 1975.*

Physical Review C, vol. 18, No. 5, pp 2122–2126, Nov. 1978.*

Int. J. of Applied Rad. & Isotopes, vol. 29, No. 415, pp 343–345, Bosch et al, May 1978.

Int. J. of Applied Rad. & Isotopes, vol. 28, pp 395–401, Kondo et al., 1977.

Int. J. of Applied Rad. & Isotopes, vol. 31, pp 141–151, Horiguchi et al, 1980.

Int. J. of Applied Rad. & Isotopes, vol. 24, No. 11, pp 651–655, Brown et al, Nov. 1973.

* cited by examiner

*Primary Examiner*—Harvey E. Behrend
(74) *Attorney, Agent, or Firm*—Bruce H. Cottrell

(57) ABSTRACT

A process for the selective production and isolation of high specific activity $Cu^{67}$ from proton-irradiated enriched $Zn^{70}$ target comprises target fabrication, target irradiation with low energy (<25 MeV) protons, chemical separation of the $Cu^{67}$ product from the target material and radioactive impurities of gallium, cobalt, iron, and stable aluminum via electrochemical methods or ion exchange using both anion and cation organic ion exchangers, chemical recovery of the enriched $Zn^{70}$ target material, and fabrication of new targets for re-irradiation is disclosed.

4 Claims, No Drawings

PRODUCTION OF HIGH SPECIFIC ACTIVITY COPPER-67

This application is a divisional of Ser. No. 8/226,526, filed Apr. 12, 1994 by Jamriska et al, now U.S. Pat. No. 6,490,330.

FIELD OF THE INVENTION

The present invention relates to the field of selective production of various radioisotopes. More particularly, the present invention relates to the production and separation of high specific activity copper isotopes, e.g., $Cu^{67}$, from irradiated enriched $Zn^{70}$ targets. This invention is the result of a contract with the Department of Energy(Contract No. W-7405-ENG-36).

BACKGROUND OF THE INVENTION

Copper-67 ($Cu^{67}$) is a radioisotope with significant potential for application in diagnostic and therapeutic nuclear medicine. As it decays to stable $Zn^{67}$, with a 2.6 day half-life, it emits beta particles with energy maxima ranging from about 0.4 MeV to about 0.6 MeV. It also emits a gamma photon of 185 keV. Excellent research has shown that the beta particles are effective in treating various tumor types when the radioisotope is delivered to the disease site. The gamma photon is well-suited for imaging applications using the conventional Anger Gamma Camera so that $Cu^{67}$ localized in a tumor, can be imaged using equipment typically available in a nuclear medicine facility. Despite its promise this radioisotope has failed to make significant impact in clinical nuclear medicine, primarily because the isotope is available only in a sporadic and limited supply. Current methods of production use high energy proton reactions on natural zinc targets at large accelerators operating only part of the year or in nuclear reactors on enriched $Zn^{67}$ using high energy neutrons.

The possibility of early lung cancer detection using porphyrin as described by Cole et al. (U.S. Pat. No. 5,162,231) and the development of labeling porphyrin with metal ions (see, e.g., Mercer-Smith et al., Vol. 1 of Targeted Diagnosis and Therapy Series, J. T. Rodwell, ed., Marcel Dekker, New York, p. 317, 1988) and research into the possibility of therapy using $Cu^{67}$ labeled monoclonal antibodies (see, e.g., de Nardo et al., J. Nucl. Med. 29, p.217, 1988) has generated increased interest in the availability of high specific activity $Cu^{67}$ on a more consistent basis. Presently, these efforts have been severely restricted as a result of the sporadic supply of the $Cu^{67}$ used for preparation of the porphyrin. Presently, accelerator-produced $Cu^{67}$ is only available from Los Alamos National Laboratory (LANL) and Brookhaven National Laboratory (BNL) in large quantities about 6 to 8 months of the year. The present production methods at LANL and BNL rely on nonspecific spallation reactions which co-produce stable copper isotopes. These stable copper isotopes dilute the specific activity to levels which are acceptable for porphyrin/monoclonal antibody labeling research but are barely adequate for therapy. Reactor production via the $Zn^{67}(n,p)Cu^{67}$ reaction is possible but production rates are too low to be financially feasible for long range treatment protocols. A number of possible methods of production were examined using the Los Alamos National Laboratory Van de Graff accelerator.

It has now been found that $Cu^{67}$ can be produced at low energies, i.e., less than about 25 MeV. Thus, $Cu^{67}$ may be produced throughout the year. As reaction pathways for production of stable copper isotopes do not exist in this reaction process, $Cu^{67}$ with a higher specific activity may be produced than is currently possible with accelerator production.

Accordingly, it is an object of this invention to provide an improved method of producing $Cu^{67}$ with a higher specific activity than previously available.

It is a further object of this invention to provide a method to produce $Cu^{67}$ continuously throughout the year using a low energy proton induced (p,$\alpha$) reaction on enriched $Zn^{70}$.

Still another object of this invention to provide a method of recovering and reusing the enriched $Zn^{70}$ target material.

A still further object of this invention to provide a method of producing $Cu^{67}$ essentially free of $Cu^{64}$ in a low energy proton accelerator.

SUMMARY OF THE INVENTION

To achieve the foregoing and other objects, and in accordance with the purposes of the present invention, as embodied and broadly described herein, the present invention provides a process of producing essentially $copper^{34}$-free $copper^{67}$ including irradiating an enriched $zinc^{70}$ target with sufficient protons of an energy from about 10 MeV to about 25 MeV for time sufficient to produce $copper^{67}$, and, separating $copper^{67}$ from the irradiated target to yield an essentially $copper^{64}$-free $copper^{67}$ product. The present invention further provides a high specific activity $copper^{67}$ product produced by the above described process, the $copper^{67}$ product characterized as essentially free of $copper^{64}$ and as having a specific activity greater than about at least 5 percent of theoretical value. The present invention further provides a process including separating enriched $zinc^{70}$ from the irradiated target and recycling the separated enriched $zinc^{70}$ into an enriched $zinc^{70}$ target for subsequent irradiation.

In one embodiment of the invention, the separation of $copper^{67}$ from the irradiated target includes dissolution of the proton-irradiated enriched zinc target in an acid solution of appropriate type and strength to form a first ion-containing solution, contacting the first ion-containing solution with a first anionic exchange resin whereby ions from the group consisting of zinc, copper, gallium, aluminum, cobalt and iron are selectively removed from the solution and ions from the group consisting of beryllium, nickel, and germanium remain in the solution, contacting the first anionic exchange resin with an second acid solution of appropriate type and strength capable of stripping the absorbed ions of copper, gallium, aluminum, cobalt, and iron from the first anionic exchange resin to form a second ion-containing solution, evaporating the second ion-containing solution for time sufficient to remove substantially all of the acid and water from the second ion-containing solution whereby a residue remains, dissolving the residue from the second ion-containing solution in a concentrated acid to form a third ion-containing solution to permit said ions to be absorbed by a first cationic exchange resin, contacting the cationic exchange resin with concentrated acid to selectively remove copper ions while any gallium, aluminum, cobalt and iron ions present remain absorbed by the first cationic exchange resin. Alternatively, the residue from the second ion-containing solution can be dissolved in a concentrated acid to form a third ion-containing solution to permit said ions to be absorbed by an anion exchange resin, and the third-ion containing solution contacted with an anionic exchange resin followed by stripping with concentrated acid to selectively remove copper ion while any gallium, aluminum, cobalt and iron ions present remain absorbed by the anion exchange resin.

DETAILED DESCRIPTION

The present invention concerns the proton irradiation, selective recovery of radioisotopes of copper and the enriched zinc target material, and fabrication of new targets from such recovered target material. Such a process can produce multi-millicurie quantities of such radioisotopes for use in the fields on nuclear medicine and/or nuclear chemistry.

In the process of the present invention, a $copper^{67}$ product essentially free of any $copper^{64}$ can be produced as the reaction with enriched $zinc^{70}$ produces only $copper^{67}$ This leads to a product that avoids the presence of a second radioisotope thus eliminating the unnecessary exposure to that radioisotope while using the targeted radioisotope. Further, as essentially only $copper^{67}$ is produced, the specific activity of the product is naturally greater. As the specific activity of radioisotopes is effected by co-production of other stable or radioactive isotopes, high specific activities cannot be achieved using previous methods. Prior $copper^{67}$ available had a specific activity of only about 1.5 percent of the theoretical maximum of about 755,000 curies per gram. The present process may achieve specific activities much higher, specific activities of greater than about 5 percent of theoretical maximum value, preferably greater than about 25 percent of theoretical maximum value, and more preferably greater than about 50 percent of theoretical maximum value.

By "essentially copper-free" is meant that the ratio of $copper^{64}$ to $copper^{67}$ is about 0.1 less to 1, preferably about 0.01 or less to 1. In contrast, previous methods of making and recovering copper generally had $copper^{64}$ to $copper^{67}$ ratios of at least around 4 or 5 to 1.

As a starting material in the present process, an enriched $Zn^{70}$ target is irradiated by protons of an energy of generally greater than 10 MeV and less than 25 MeV. To produce the desired quantities of $Cu^{67}$, the $Zn^{70}$ target should be enriched to at least about 70 percent, preferably greater, should have a weight of from about 250 milligrams to about 500 milligrams and should be from about 0.5 mm in thickness to about 0.75 mm in thickness. This irradiation can be accomplished by inserting the target into any particle accelerator capable of producing proton beams of the desired energy and beam current. A beam current of greater than about 20 microamps, but generally less than about 500 microamps, is generally preferred to maximize production.

The proton-irradiated $Zn^{70}$ target is dissolved in 6 M HCl prepared from concentrated, ultra pure, copper-free hydrochloric acid and 17.9 Meg-ohm water and the resultant solution adjusted to about 8–10 M HCl with concentrated, ultrapure, copper-free hydrochloric acid and contacted with an first anion exchange resin. The anion resin is preferably a strong basic resin and can be, for example, AG1-X8, available from Bio-Rad Laboratories. Generally the anions of zinc, copper, gallium, cobalt and iron will be absorbed on the resin while other ions including beryllium, nickel, and germanium if present will remain in the solution and can be effectively separated from the anion exchange resin. Residual cations in solution may be removed from the resin by washing or rinsing with 8–10 M HCl. The mesh size of the anion exchange resin can be from about 50 mesh to about 400 mesh, more preferably from about 100 mesh to about 200 mesh.

The absorbed anions of $Cu^{67}$ and gallium can then be stripped from the resin by contacting the resin with and acid solution capable of removing such ions. Generally, the acid solution can be from 1 molar (M) hydrochloric acid to about 4 M hydrochloric acid, preferably about 2 M hydrochloric acid. The strip solution is evaporated to dryness, and dissolved in concentrated, ultrapure, copper-free hydrochloric acid. The dissolved residue is then contacted with a first cation exchange resin. The cation resin is preferably a strong acid resin and can be, for example AG50W-X8, available from Bio-Rad Laboratories. Generally the ions of gallium will be absorbed on the resin while the ions of $Cu^{67}$ will remain in solution and can be effectively separated from the cation resin. The cation resin is then washed with concentrated, ultrapure, copper-free hydrochloric acid to remove residual $Cu^{67}$ ions. All of the concentrated, ultrapure, copper-free hydrochloric acid fractions containing $Cu^{67}$ ions are combined, evaporated to dryness, dissolved in dilute hydrochloric acid prepared from concentrated, ultrapure, copper-free hydrochloric acid and 17.9 Meg-Ohm water to form the product solution. Generally this dilute hydrochloric acid can be from about 0.01 M hydrochloric acid to about 1 M hydrochloric acid, preferably about 0.1 M hydrochloric acid. Alternatively, the 2 M hydrochloric acid strip solution may be evaporated to dryness, dissolved in concentrated, ultrapure, copper-free hydrochloric acid and contacted with a second anion exchange resin. The anion resin is preferably a strong basic resin and can be, for example, AG1-X8, available from Bio-Rad Laboratories. Washing with 10–15 resin volumes of concentrated, ultrapure, copper-free hydrochloric acid will recover all of the $Cu^{67}$ product free of gallium ions. All of the concentrated, ultrapure, copper-free hydrochloric acid containing $Cu^{67}$ ions are combined, evaporated to dryness, dissolved in dilute hydrochloric acid prepared from concentrated, ultrapure, copper-free hydrochloric acid and 17.9 Meg-Ohm water to form the product solution. Generally this dilute hydrochloric acid can be from about 0.01 M hydrochloric acid to about 1 M hydrochloric acid, preferably about 0.1 M hydrochloric acid.

The enriched zinc target material may be recovered from the first anion exchange resin with dilute nitric acid. Generally this dilute nitric acid can be from about 0.5 M nitric acid to about 4 M nitric acid, preferably about 2 M nitric acid. The recovered zinc target material may then be converted to the chemical form required for fabricating a new target. This may include electrochemical deposition of the metal or conversion to the oxide chemically.

The present invention is more particularly described in the following examples which are intended as illustrative only, since numerous modifications and variations will be apparent to those skilled in the art.

EXAMPLE 1

A 0.97 cm diameter by 0.02 mm thick target consisting of 10.0 mg of 99.82% enriched $Zn^{70}$ as oxide compacted between pure aluminum foils was irradiated for 1 hr with 18.8 MeV protons at a current of 4.00 microamperes ($\mu$A). This target yielded 8.05 $\mu$Ci of $Cu^{67}$, 0.325 $\mu$Ci of $Ga^{67}$ and traces of other zinc and cobalt isotopes at the end of bombardment. The irradiated aluminum containing the $Zn^{70}$ target was dissolved in 20 mL of 6 M HCl. Ten mL of concentrated HCl was added to adjust the molarity to about 9 M HCl and the solution was contacted with 7 mL of anion exchange resin (AG1-X8). The resin was then rinsed with 15 mL of 9 M HCl and the copper and gallium isotopes were stripped from the column with 60 mL of 2 M HCl. The strip solution was evaporated to dryness and dissolved in 3 mL of concentrated HCl.

The 3 mL solution was then contacted with 3 mL of cation exchange resin (AG50-WX8) and the resin washed with 2 mL of concentrated HCl. The resin was then washed with 5 mL of concentrated HCl and collected into a clean vial. Both vials of concentrated HCl were then analyzed for $Cu^{67}$ content and radioimpurities. Vial 1 contained 7.81 $\mu$Ci of $Cu^{67}$ and a trace of cobalt isotopes. Vial 2 contained 0.235 $\mu$Ci of $Cu^{67}$ with the same trace of cobalt isotopes as in the first vial. Total yield of $Cu^{67}$ was 8.05 $\mu$Ci $Cu^{67}$ at end of bombardment.

The first anion exchange resin was washed with 2×30 mL of 2 M HNO3 to recover the enriched Zn target material. Greater than 96% of the enriched $Zn^{70}$ was in the first 30 mL of wash. These solutions were combined and saved for replating a new target.

EXAMPLE 2

A 0.97 cm diameter by 0.02 mm thick target consisting of 10.7 mg of 71.6% enriched $Zn^{70}$ as oxide compacted between pure aluminum foils was irradiated for 1 hr with 18.8 MeV protons at a current of 5.11 $\mu$A. This target yielded 10.4 $\mu$Ci of $Cu^{67}$, 108 $\mu$Ci of $Ga^{67}$ and traces of other zinc and cobalt isotopes at the end of bombardment. The irradiated aluminum containing the $Zn^{70}$ target was dissolved in 20 mL of 6 M HCl. Ten mL of concentrated HCl was added to adjust the molarity to about 9 M HCl and the solution was contacted with 7 mL of anion exchange resin (AG1-X8). The resin was then rinsed with 15 mL of 9 M HCl and the copper and gallium isotopes were stripped from the column with 60 mL of 2 M HCl. The strip solution was evaporated to dryness and dissolved in 3 mL of concentrated HCl.

The 3 mL solution was then contacted with 3 mL of cation exchange resin (AG50-WX8) and the resin washed with 2 mL of concentrated HCl. The 5 mL of concentrated HCl was passed through a second 3 mL cation resin column and the resin washed with 3 mL of concentrated HCl. The combined 8 mL of solution was then passed through a third 3 mL cation column and the resin was then washed with 4.85 mL of concentrated HCl and collected into a clean vial. Both vials of concentrated HCl were then combined and analyzed for $Cu^{67}$ content and radioimpurities. Total yield of $Cu^{67}$ was 10.4 $\mu$Ci $Cu^{67}$ in 12.85 mL.

The first anion exchange resin was washed with 2×30 mL of 2 M HNO3 to recover the enriched $Zn^{70}$ target material. Greater than 95% of the enriched $Zn^{70}$ was in the first 30 mL of wash. These solutions were combined and saved for replating a new target.

Although the present invention has been described with reference to specific details, it is not intended that such details should be regarded as limitations upon the scope of the invention, except as and to the extent that they are included in the accompanying claims.

What is claimed is:

1. A high specific activity $copper^{67}$ product produced by the process comprising irradiating an enriched $zinc^{70}$ target with protons of an energy from about 10 MeV to about 25 MeV to produce $copper^{67}$; and, separating $copper^{67}$ from the irradiated target to yield an essentially $copper^{64}$-free $copper^{67}$ product having a $copper^{64}$ to $copper^{67}$ ratio of less than 0.1 to 1.

2. A $copper^{67}$ product characterized as essentially free of $copper^{64}$ having a $copper^{64}$ to $copper^{67}$ ratio of less than 0.1 to 1 and as having a specific activity greter than about 5 percent of theoretical maximum value.

3. The product of claim 1 wherein said enriched $zinc^{70}$ target contains at least about 70 percent $zinc^{70}$.

4. The product of claim 1 wherein said enriched $zinc^{70}$ target contains about 99 percent $zinc^{70}$.

* * * * *